US011314512B2

United States Patent
Leber et al.

(10) Patent No.: US 11,314,512 B2
(45) Date of Patent: Apr. 26, 2022

(54) EFFICIENT CHECKING OF A CONDITION CODE ANTICIPATOR FOR A FLOATING POINT PROCESSOR AND/OR UNIT

(71) Applicant: International Business Machines Corporation, Armonk, NY (US)

(72) Inventors: Petra Leber, Ehningen (DE); Kerstin Claudia Schelm, Stuttgart (DE); Cedric Lichtenau, Stuttgart (DE); Michael Klein, Schoenaich (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 397 days.

(21) Appl. No.: 16/536,671

(22) Filed: Aug. 9, 2019

(65) Prior Publication Data

US 2021/0042119 A1  Feb. 11, 2021

(51) Int. Cl.
| | | |
|---|---|---|
| *G06F 11/00* | (2006.01) | |
| *G06F 9/30* | (2018.01) | |
| *G06F 11/07* | (2006.01) | |

(52) U.S. Cl.
CPC ........ *G06F 9/30094* (2013.01); *G06F 9/3001* (2013.01); *G06F 11/0721* (2013.01); *G06F 11/0751* (2013.01); *G06F 11/0772* (2013.01)

(58) Field of Classification Search
CPC ............ G06F 11/0721; G06F 11/0751; G06F 11/0772; G06F 11/277; G06F 9/30094
See application file for complete search history.

(56) References Cited

U.S. PATENT DOCUMENTS

| | | | |
|---|---|---|---|
| 4,947,359 A | 8/1990 | Vassiliadia et al. | |
| 5,862,065 A | 1/1999 | Muthusamy | |
| 7,058,830 B2 | 6/2006 | Dhong et al. | |
| 7,886,133 B2 * | 2/2011 | Watanabe ........... | G06F 9/30181 712/234 |
| 8,555,039 B2 | 10/2013 | Rychlik | |
| 8,838,665 B2 * | 9/2014 | Pitkethly ................... | G06F 7/48 708/525 |
| 9,684,514 B2 | 6/2017 | Carlough et al. | |
| 9,684,515 B2 * | 6/2017 | Carlough ............ | G06F 9/30058 |
| 11,023,205 B2 * | 6/2021 | Lichtenau ........... | G06F 9/30189 |

(Continued)

FOREIGN PATENT DOCUMENTS

EP  0992884 B1  12/2004

OTHER PUBLICATIONS

Transmittal Form PTO/SB/21, signed Mar. 17, 2020.

(Continued)

*Primary Examiner* — Elmira Mehrmanesh

(74) *Attorney, Agent, or Firm* — Cantor Colburn LLP; Edward Wixted

(57) ABSTRACT

An aspect includes generating a data result and a special case indicator based on an instruction and at least one input data operand. Outputting the data result to a processor core. Outputting the first condition code to the processor core prior to outputting the data result to the processor core. Generating a second condition code based on the data result and the special case indicator. Performing a check by comparing the first condition code and the second condition code and flagging an error to the processor core upon the first condition code being different from the second condition code.

20 Claims, 4 Drawing Sheets

(56) References Cited

U.S. PATENT DOCUMENTS

| | | | |
|---|---|---|---|
| 2008/0052683 A1* | 2/2008 | Bates | G06F 11/3612 |
| | | | 717/129 |
| 2008/0276072 A1 | 11/2008 | Rychlik | |
| 2015/0378679 A1 | 12/2015 | Dao et al. | |
| 2015/0378680 A1 | 12/2015 | Dao et al. | |
| 2017/0235574 A1 | 8/2017 | Carlough et al. | |
| 2018/0329684 A1 | 11/2018 | Hack et al. | |

OTHER PUBLICATIONS

IBM Hexadecimal Floating-Point Wikipedia, Wikimedia Foundation, Aug. 14, 2016, enwikipedia.org/w/index.php?title=IBM_hexadecimial_floating-point&direction=prev&oldid=734514901. (Year 2016), 6 pages.

Lichtenau et al.; "Quad Precision Floating Point on the IBM z13™"; 2016 IEEE 23nd Symposium on Computer Arithmetic; 8 pages.

List of IBM Patents or Patent Applications Treated as Related; Date Filed: Aug. 9, 2019, 2 pages.

Mueller et al.; "Condition Code Anticipator for Hexadecimal Floating Point"; U.S. Appl. No. 16/536,663, filed Aug. 9, 2019.

* cited by examiner

EFFICIENT CHECKING OF A CONDITION CODE ANTICIPATOR FOR A FLOATING POINT PROCESSOR AND/OR UNIT

BACKGROUND

The present invention generally relates to floating point processors, and more specifically, to efficient checking of a condition code anticipator (CCA) for a floating point processor and/or unit.

Floating point numbers are used in computing systems to represent a large range of numbers via a limited number of bits. Floating point numbers are represented by a number value and an exponent associated with that number value. Some computing systems utilize a dedicated unit known as floating point unit to handle floating point numbers computation.

Modern processors use special conditions, like overflow, or values of the result, like result equal zero to branch to different part of a program. These special conditions and values of the result are called condition code. To increase performance, one would like to have the condition code outcome as soon as possible to determine if a branch instruction that is dependent on the computed floating point operation will take the branch or not. Therefore, it is performance wise advantageous to compute the condition code before the actual result of the floating point operation is available.

SUMMARY

Embodiments of the present invention provide a computer-implemented method checking a condition code anticipator. A non-limiting example of the computer-implemented method includes generating, by a system having one or more processors, a data result and a special case indicator, in which the generating includes performing an arithmetic computation based at least in part on an instruction and at least one input data operand. The method includes outputting, by the system, the data result. The method includes generating, by the system, a first condition code based on the instruction and the at least one input data operand. The method includes outputting, by the system, the first condition code to the processor core prior to outputting the data result. The method includes generating, by the system, a second condition code based on the data result and the special case indicator. The method includes performing, by the system, a check by comparing the first condition code and the second condition code and flagging an error to the processor core upon the first condition code being different from the second condition code.

Embodiments of the present invention provide a system for checking a condition code anticipator. A non-limiting example of the system includes one or more processors configured to perform a method. A non-limiting example method includes generating, by the system, a data result and a special case indicator, in which the generating includes performing an arithmetic computation based at least in part on an instruction and at least one input data operand. The method includes outputting, by the system, the data result to a processor core. The method includes generating, by the system, a first condition code based on the instruction and the at least one input data operand. The method includes outputting, by the system, the first condition code to the processor core prior to outputting the data result. The method includes generating, by the system, a second condition code based on the data result and the special case indicator. The method includes performing, by the system, a check by comparing the first condition code and the second condition code and flagging an error to the processor core upon the first condition code being different from the second condition code.

Embodiments of the invention provide a computer program product for reliability availability serviceability checking of a condition code anticipator, the computer program product comprising a computer readable storage medium having program instructions embodied therewith. The program instructions are executable by a system comprising one or more processors cause the system to perform a method. A non-limiting example method includes A non-limiting example method includes generating, by the system, a data result and a special case indicator, in which the generating includes performing an arithmetic computation based at least in part on an instruction and at least one input data operand. The method includes outputting, by the system, the data result to a processor core. The method includes generating, by the system, a first condition code based on the instruction and the at least one input data operand. The method includes outputting, by the system, the first condition code to the processor core prior to outputting the data result. The method includes generating, by the system, a second condition code based on the data result and the special case indicator. The method includes performing, by the system, a check by comparing the first condition code and the second condition code and flagging an error to the processor core upon the first condition code being different from the second condition code.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
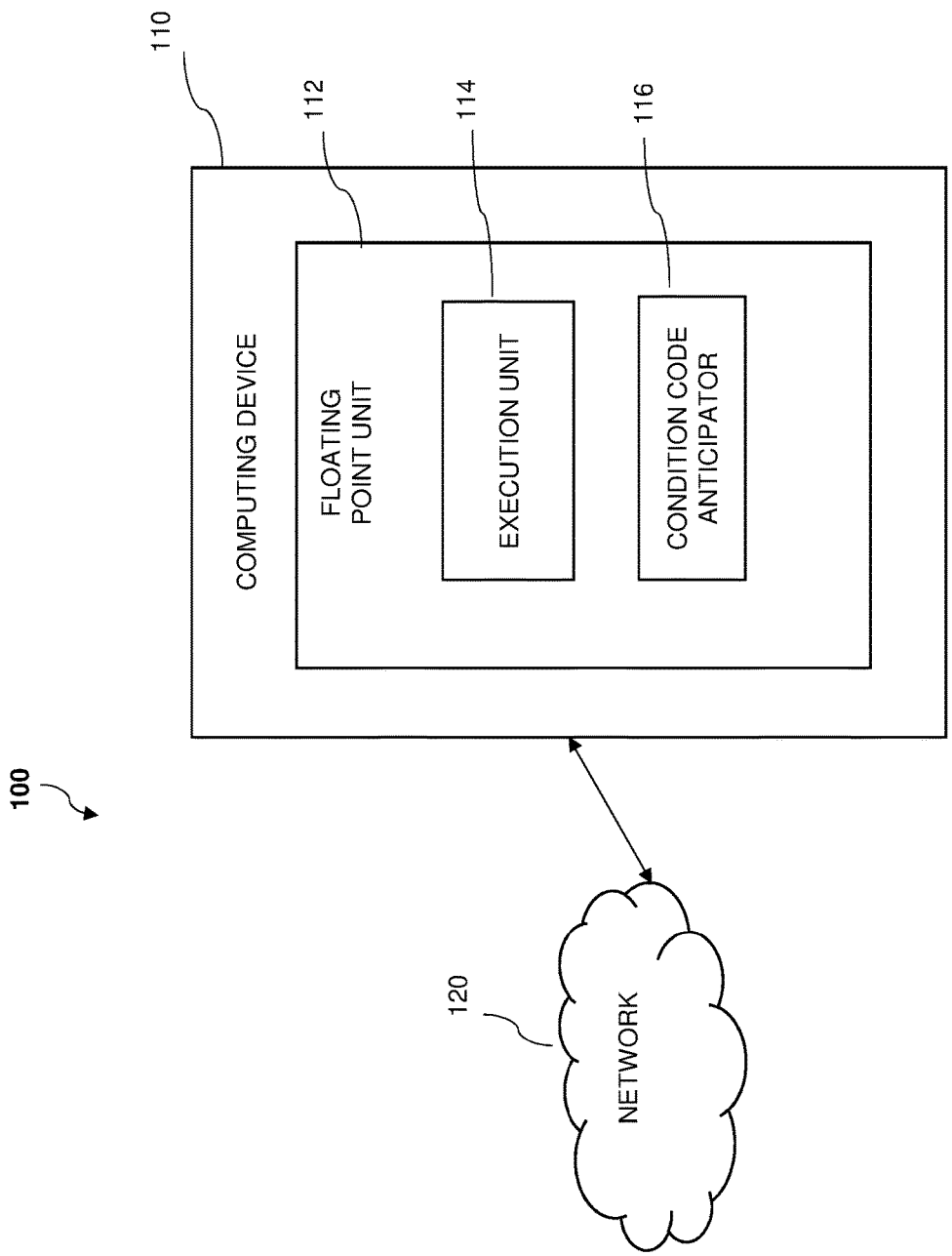
FIG. 1 depicts a functional block diagram illustrating a computing environment having a floating point unit according to one or more embodiments of the invention.

The diagrams depicted herein are illustrative. There can be many variations to the diagrams or the operations described therein without departing from the spirit of the invention. For instance, the actions can be performed in a differing order or actions can be added, deleted, or modified. Also, the term "coupled" and variations thereof describe having a communications path between two elements and do not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

One or more embodiments of the present invention provide the ability to check and/or verify the correctness of a condition code anticipator (CCA) circuit that provided the condition code before the actual result of the floating point operation is known. The verification can include performing a reliability, availability, and serviceability (RAS) check on the (CCA) by storing the anticipated condition code generated by the CCA and then comparing it to the actual result and/or condition code output by an execution unit. When compared to contemporary approaches which directly check a CCA circuit, one or more embodiments allow the computing system to perform the verification while minimizing hardware complexity, area, and power by storing the anticipated condition code and then performing a comparison operation at a later time. One or more embodiments of the present invention also provide the ability to generate the anticipated condition code two or more cycles before the actual result is generated by an execution unit.

Floating point units are specialized processors designed to perform floating point arithmetic such as, for example, addition, subtraction, multiplication, division, bit shifting and/or other suitable operations. While floating point numbers typically have larger ranges than integer number, the representations of floating point numbers are limited due to the amount of storage available to store the representation. For example, a floating point number representation may limit the range of exponents that can be stored. An underflow or overflow then occurs when an exponent falls outside this range. Underflow is a condition that occurs when a calculated number is less than the smallest number that a given floating point number can represent. Overflow is a condition that occurs when a calculated number is greater than the largest number that a given floating point number can represent.

Contemporary systems that utilize CCAs to generate anticipated condition codes often require duplication of anticipator logic or partially duplicated anticipator logic to perform any backend testing for errors. This can result in the need for a large circuit area, increased congestion, and large power consumption.

The above-described aspects of the invention can address shortcomings of the prior art by, instead of directly checking a CCA circuit, storing the anticipated condition code at the time of generation and then comparing it against a final result at a later time. This allows the computing system to minimize hardware complexity, area, and power by not requiring duplication or partial duplication of CCA circuitry. Embodiments of the improved CCA circuitry are able to anticipate an exact condition code two or more cycles before the actual result is generated. This anticipated condition code is compared against the condition code of the final result to ascertain correctness, accuracy, and/or reliability.

Turning now to a more detailed description of aspects of the present invention, FIG. 1 depicts a functional block diagram illustrating a computing environment 100 having a floating point unit according to one or more embodiments of the invention. Computing environment 100 includes a computing device 110 connected over network 120. Computing device 110 includes a floating point unit 112. In some embodiments of the present invention, floating point unit 112 includes circuit logic for controlling operation of an execution unit 114 and a condition code anticipator 116.

In some embodiments of the present invention, computing device 110 is a computing device that can be, for example, a standalone device, a server, a laptop computer, a tablet computer, a netbook computer, a personal computer (PC), or a desktop computer. In some embodiments of the present invention, computing device 110 is a computing system that utilized clustered computers and components to act as a single pool of seamless resources. In general, computing device 110 can be any suitable computing device or a combination of devices that have access to floating point unit 112 and are capable of executing execution unit 114 and condition code anticipator 116. Computing device 110 may include internal and external hardware components, as depicted and described in further detail with respect to FIG. 4. In some embodiments of the present invention, floating point unit 112 is a component of computer processor(s) 402. In some embodiments of the present invention, floating point unit 112 is a separate component of computing device 110.

In the embodiment shown in FIG. 1, execution unit 114 and CCA 116 are located on floating point unit 112. However, in other embodiments, execution unit 114 and/or condition code anticipator 116 may be located externally to the floating point unit 112 and accessed through a communication network, such as network 120. Network 120 can be, for example, a local area network (LAN), a wide area network (WAN) such as the Internet, or a combination of the two, and may include wired, wireless, fiber optic or any other suitable connection known in the art. In general, network 120 can be any suitable combination of connections and/or protocols that will support communications between computing device 110 and other devices (not shown), in accordance with embodiments of the present invention.

In some embodiments of the present invention, floating point unit 112 is configured to perform arithmetic and/or logic operations on floating point numbers. Computing device 110 stores the representation of a floating point number in main memory 410 or secondary memory 412, as discussed below in reference to FIG. 4. In some embodiments of the present invention, the representation of the floating point number includes include a sign (i.e., positive or negative), a significand and an exponent. In some embodiments of the present invention, due to the standardization of the representation on said computing device 110 (e.g., a certain representation is designed with a specific base to be used such as binary with base 2, decimal with base 10 or hexadecimal with base 16), the base of the floating point number is omitted from the representation when storing. Computing device 110 stores the representation of a floating point number with a finite precision of digits such as bits, in which the significand and exponent are allocated a certain number of digits.

As noted above, due to the finite amount of memory that may be allocated for storing a floating number representation, in some embodiments of the present invention, computing device 110 stores only a predetermined range of real numbers for a given floating point representation. As such, in some embodiments of the present invention, floating point unit 112 may only perform operations with floating point numbers and produce results within the predetermined range. The number of digits or bits for the exponent is the primary component that determines the size of this range.

In some embodiments of the present invention, execution unit 114 is configured to perform instructions or operations and generate a result or resultant based on the instructions. Floating point unit 112 receives instructions from computing device 110 to perform arithmetic and logic operations on one or more operands. For example, consider a scenario where floating point unit 112 receives a request to add two operands denoted A and B. Based on the received instruction, floating point unit 112 then sends the received operands to execution unit 114 to perform the instruction. Execution unit 114 perform the requested instruction (e.g., add operation) using the received operands (e.g., A and B). Execution unit 114 generates a data result (e.g., C) or value based on the received instruction or operation (e.g., C=A+B) when performed using the one or more operands. Operands represent input floating point values to be processed by floating point unit 112. The components of the operands define their respective floating point values by: the sign (+/−), exponent, and significand or mantissa.

In some embodiments of the present invention, execution unit 114 is configured to perform a single operation or instruction. In some embodiments of the present invention, execution unit 114 is configured to perform a multiple operations or instructions.

Based on the data result, execution unit 114 may generate a condition code, which includes flags or other representations that indicate that the data result generated by execution unit 114 may include errors or exceptions when performing an operation. Examples of conditions that a condition code may represent include, but are not limited to, an overflow or underflow condition. An overflow condition occurs in a floating point number when the exponent of the floating point number exceeds the value that the representation of the exponent in computing device 110 is capable of storing. An underflow condition occurs when the exponent becomes smaller than the value that the representation of the exponent in computing device 110 is capable of storing.

Early generation of a condition code can be particularly useful when there is not much latency between when a floating point operation that sets a condition code is issued and when the condition code is used by a branch instruction. For instance, consider a scenario where an instruction set architecture (ISA) allows for a condition code to be set based upon a comparison operation. The comparison may use registers that are set by, or depend on, the results of a prior floating point operation. A subsequent branch instruction would therefore be at least one instruction removed from the floating point operation. In some embodiments of the present invention, an ISA allows for condition codes to be set directly by a floating point operation (e.g., add, subtract or convert). Thus, it is possible that a branch instruction may immediately follow a floating point operation that sets the condition code. The resulting reduction in latency between the floating point operating and use of a dependent condition code can be facilitated by early generation of the condition code by condition code anticipator 116 during the execution of the floating point operation upon which the condition code depends.

In some embodiments of the present invention, condition code anticipator 116 includes condition code generator logic that can anticipate a condition code based on the instruction and input data operands prior to the execution unit generated a data result from the instruction and input data operands. The condition code generator logic can determine a value for the condition code based upon analysis of the operands data and the instruction. As a result, in a high frequency design the condition code generator logic can begin determining the condition code up to two cycles before the value of floating point number is known. This can allow for the condition code to be available for use two or more cycles sooner.

For example, in some embodiments of the present invention, for an instruction or operation performed by execution unit 114, condition code anticipator 116 is configured to anticipate, prior to normalization performed by execution unit 114, whether a condition code will occur. A condition code is an exception produced by floating point unit 112 when an operation produces an error, such as exponent underflow or overflow. In some embodiments of the present invention, condition code anticipator 116 receives the intermediate result from execution unit 114. Based on the exponent of the intermediate result, condition code anticipator 116 generates a mask to evaluate the significand of the intermediate result. A mask is a series of bits that passes through the value of certain bits of the significand (e.g., maintain or keep the bit value of the significand). The mask also forces or overwrites other bits to be certain value (e.g., make the bit value be either "1" or "0" regardless of the significand bit value). For example, a mask may pass through some bits of the significand, keeping the value the same as the significand, and overwrite other bits to be a "1", changing the value to "1" regardless of the bit value of the significand.

Figure 2:
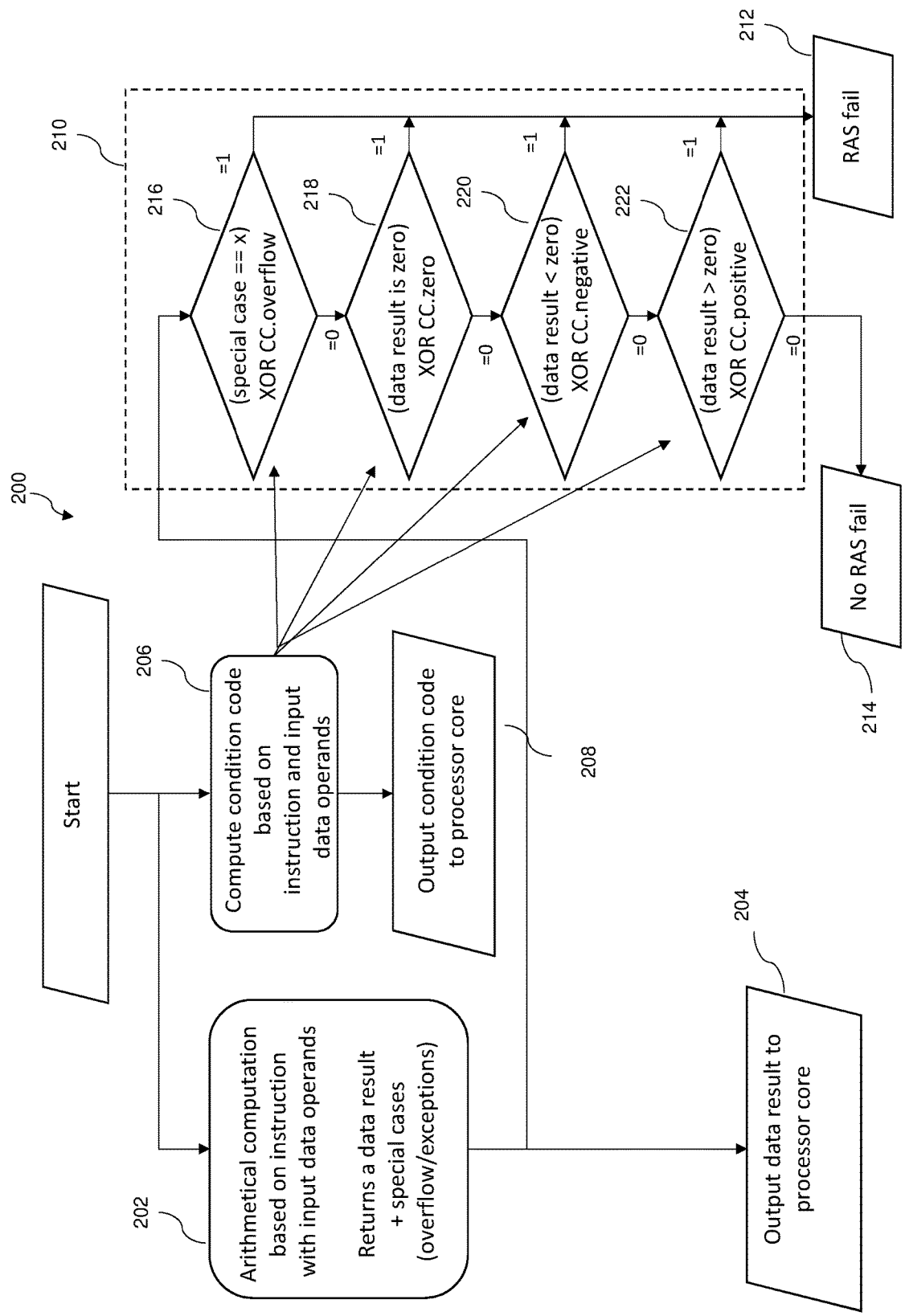
FIG. 2 depicts a flow diagram for performing a reliability availability serviceability check on a condition code generated by a condition code anticipator in accordance with one or more embodiments of the present invention.

FIG. 2 depicts a flow diagram 200 for performing a RAS check on a condition code generated by a CCA in accordance with one or more embodiments of the present invention. The RAS check assists in confirming, or verifying, the correctness of the condition code generated by the condition code anticipator. At block 202, an arithmetic computation is generated based on a received instruction and one or more received input data operands (e.g., via execution unit 114 of FIG. 1). The arithmetic computation returns a data result and an indication of special cases such as, for example, an overflow, underflow, or other exception. At block 204, the data result is outputted to a processing core. Prior to the arithmetical computation being completed and/or prior to the data result being outputted to the processing core, at block 206 a condition code is generated (i.e., anticipated) by a condition code anticipator based on the received instruction and the input data operands. In some embodiments of the present intention, the condition code is generated two cycles prior to the actual data result being generated and/or outputted. Accordingly, condition code anticipates the exact condition code before the data result is outputted. At block 208, the condition code generated by the condition code anticipator is outputted to the processor core and/or stored in storage memory. At block 210, a RAS check is instituted that compares the generated condition code to the output data result and special case indicator. In some embodiments of the present invention, a second condition code is generated based on the output data result and special case indicator such that the second condition code is the condition code that is generated at the time of generating the data result whereas the prior referenced condition code is an anticipated condition. The second condition code encodes special cases. These codes are compared to each other and then at block 212 an RAS error is flagged to the processor core if the condition codes are not identical to each other. At block 214, if the codes are identical, then the RAS check passed. In some embodiments of the present invention, the comparison of the codes includes comparing the anticipated condition code to the output data result and then passing and/or failing the check depending on an outcome of certain determinations.

For example, in some embodiments of the present invention, the comparison includes checking whether the data result is a special value (block 216), checking whether the data result is zero and not a special value (block 218), checking whether the result is a negative non-zero number (block 220), and checking whether the result is a positive non-zero number (block 222). As will be discussed in further detail below, blocks 216-222 illustrate various Boolean expressions that may be utilized to determine whether the RAS check passed or failed.

In some embodiments of the present invention, the generation of the second condition code includes setting the second condition code to be equal to zero based on the data result being zero and the special case indicator not indicating an exception. In some embodiments of the present invention, the generation of the second condition code further or alternatively includes the second condition code to be equal to one based on a sign of the data result being negative and the special case indicator not indicating the exception. In some embodiments of the present invention, the generation of the second condition code further or alternatively includes setting the second condition code to be equal to two based on the sign of the data result being positive and the special case indicator not indicating the exception. In some embodiments of the present invention, the generation of the second condition code further or alternatively includes setting the second condition code to be equal to three based on the special case indicator indicating the exception. In other words, in some embodiments of the present invention, the second condition code is zero if the data result is zero and not a special value, is one if the data result is negative and not a special value, is two if the data result is positive and not a special value, and is three if the data result is a special value. In such embodiments, the first condition code would be generated using a similar scheme except that it would be based on the instruction and the input data operands rather than the data result.

Figure 3:
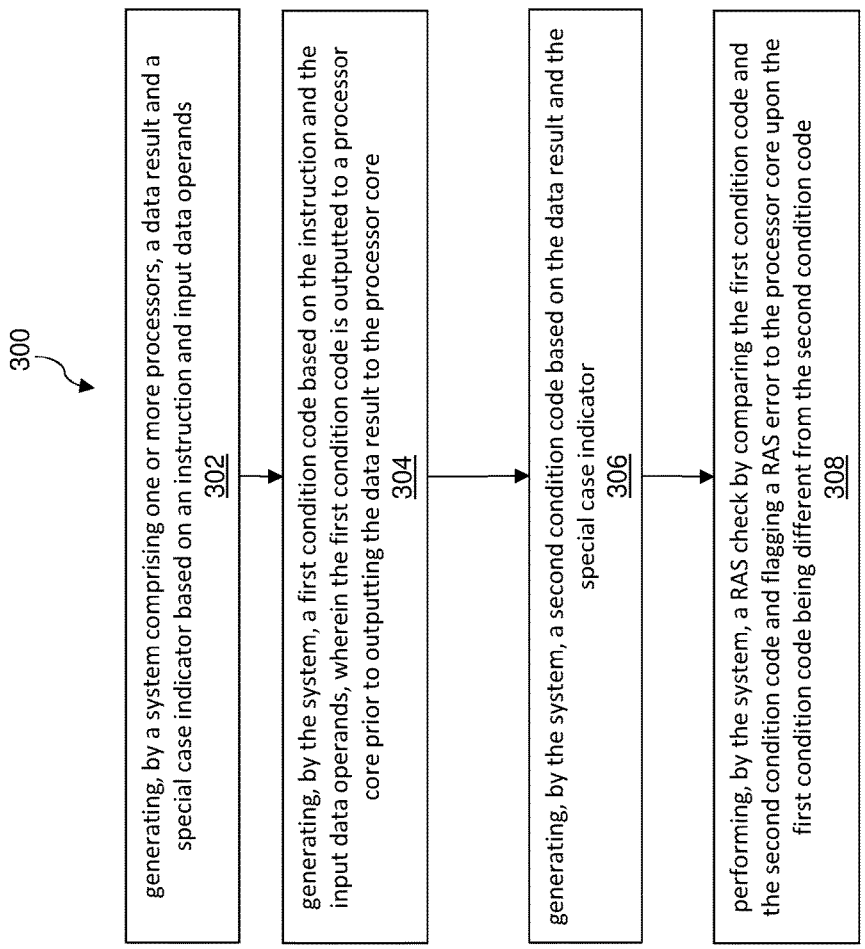
FIG. 3 depicts a flow diagram illustrating a methodology in accordance with one or more embodiments of the present invention.

Additional details of the operation of computer environment 100 will now be described with reference to FIG. 3, wherein FIG. 3 depicts a flow diagram illustrating a methodology 300 according to one or more embodiments of the present invention. At block 302 a data result and a special case indicator are generated based on an instruction and input data operands. In some embodiments of the present invention, the data result and special case indicator are generated by performing an arithmetical computation of a floating point number based on the instruction and input data operands. At block 304, a first condition code is generated based on the instruction and the input data operands, in which the first condition code is outputted to a processor core prior to outputting the data result to the processor. The first condition code is an anticipated condition code that is generated by a condition code anticipator. At block 306, a second condition code is generated based on the data result and the special case indicator. The second condition code is the actual condition code that is generated as a result of generating the data result by, for example, an arithmetic logic unit. At block 308, a RAS check is performed by comparing the first condition code and the second condition code and flagging a RAS error to the processor core upon the first condition code being different from the second condition code.

In some embodiments of the present invention, the comparing of the first condition code and the second condition code includes determining whether the special case indicator indicates an exception and determining whether the first condition code indicates the exception. The flagging the RAS error to the processor core is performed based on one or both of: the first condition code indicating the exception and the special case indicator not indicating the exception; or the special case indicator indicating the exception and the first condition code not indicating the exception. For example, as shown in FIG. 2 block 216, a RAS error is flagged to the processor core if the following condition exists: (special case==x) XOR CC.overflow=1. The value of "1" represents a Boolean result of true whereas "0" represents a Boolean result of false. "CC" represents the first condition code.

In some embodiments of the present invention, the comparing of the first condition code and the second condition code includes determining whether the data result is equal to zero and determining whether the first condition code indicates zero. The flagging the RAS error to the processor core is performed based on one or both of: the first condition code indicating zero and the data result not being equal zero; or the data result being equal to zero and the first condition code not indicating zero. For example, as shown in FIG. 2 block 218, a RAS error is flagged to the processor core if the following condition exists: (data result is zero) XOR CC.zero=1.

In some embodiments of the present invention, the comparing of the first condition code and the second condition code further includes determining whether the data result is less than zero and determining whether the first condition code indicates negative. The flagging the RAS error to the processor core is performed based on one or both of: the first condition code indicating negative and the data result not being less than zero; or the data result being less than zero and the first condition code not indicating negative. For example, as shown in FIG. 2 block 220, a RAS error is flagged to the processor core if the following condition exists: (data result<zero) XOR CC.negative=1.

In some embodiments of the present invention, the comparing of the first condition code and the second condition code further includes determining whether the data result is greater than zero and determining whether the first condition code indicates positive. The flagging the RAS error to the processor core is performed based on one or both of: the first condition code indicating positive and the data result not being greater than zero; or (b) the data result being greater than zero and the first condition code not indicating positive. For example, as shown in FIG. 2 block 222, a RAS error is flagged to the processor core if the following condition exists: (data result>zero) XOR CC.positive=1.

Accordingly, if any of blocks 216-222 of FIG. 2 indicate that the statement therein is true, the RAS check fails and a flag is issued. In contrast, in some embodiment of the present invention, if all of blocks 216-222 indicate that their respective statements are false, the RAS check passes. In reference to methodology 300, in some embodiments of the present invention, the comparing of the first condition code and the second condition code includes determining whether the special case indicator indicates an exception, determining whether the first condition code indicates the exception, determining whether the data result is equal to zero, determining whether the first condition code indicates zero, determining whether the data result is less than zero, determining whether the first condition code indicates negative, determining whether the data result is greater than zero, and determining whether the first condition code indicates positive. The RAS check passes and the flagging of the RAS error to the processor does not occur if the following Boolean statement is true:

(a) (1) the first condition code indicates the exception and the special case indicator indicates the exception or (2) the first condition code does not indicate the exception and the special case indicator does not indicate the exception;

(b) (1) the data result is equal to zero and the first condition code indicates zero or (2) the data result is not equal to zero and the first condition code does not indicate zero;

(c) (1) the data result is less than zero and the first condition code indicates less than zero or (2) the data result is not less than zero and the first condition does not indicate less than zero; and (d) (1) the data result is greater than zero and the first condition code indicates greater than zero or (2) the data result is not greater than zero and the first condition does not indicate greater than zero.

Figure 4:
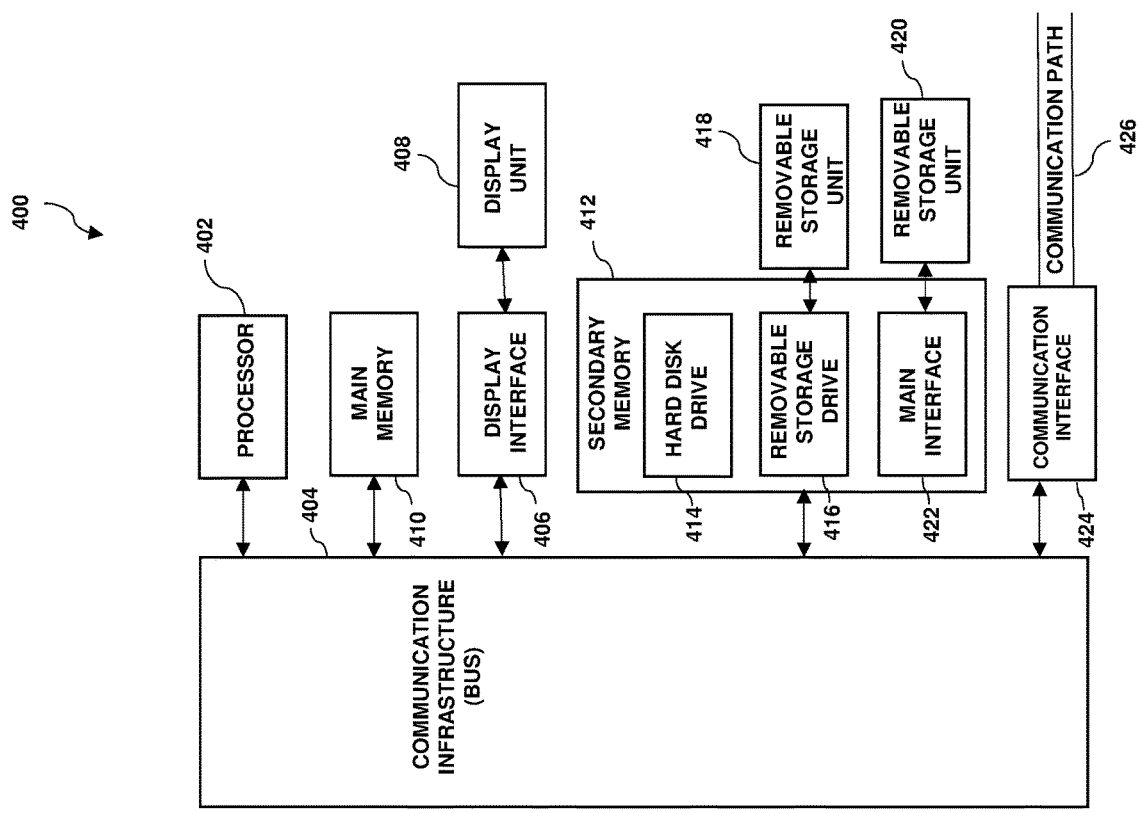
FIG. 4 depicts an exemplary computer system capable of implementing one or more embodiments of the present invention.

FIG. 4 illustrates a high-level block diagram showing an example of a computer-based system 400 useful for implementing one or more embodiments of the invention. Although one exemplary computer system 400 is shown, computer system 400 includes a communication path 426, which connects computer system 400 to additional systems and may include one or more wide area networks (WANs) and/or local area networks (LANs) such as the Internet, intranet(s), and/or wireless communication network(s). Computer system 400 and additional systems are in communication via communication path 426, (e.g., to communicate data between them).

Computer system 400 includes one or more processors, such as processor 402. Processor 402 is connected to a communication infrastructure 404 (e.g., a communications bus, cross-over bar, or network). Computer system 400 can include a display interface 406 that forwards graphics, text, and other data from communication infrastructure 404 (or from a frame buffer not shown) for display on a display unit 408. Computer system 400 also includes a main memory 410, preferably random access memory (RAM), and may also include a secondary memory 412. Secondary memory 412 may include, for example, a hard disk drive 414 and/or a removable storage drive 416, representing, for example, a floppy disk drive, a magnetic tape drive, or an optical disk drive. Removable storage drive 416 reads from and/or writes to a removable storage unit 418 in a manner well known to those having ordinary skill in the art. Removable storage unit 418 represents, for example, a floppy disk, a compact disc, a magnetic tape, or an optical disk, etc. which is read by and written to by removable storage drive 416. As will be appreciated, removable storage unit 418 includes a computer readable medium having stored therein computer software and/or data.

In some alternative embodiments of the invention, secondary memory 412 may include other similar means for allowing computer programs or other instructions to be loaded into the computer system. Such means may include, for example, a removable storage unit 420 and an interface 422. Examples of such means may include a program package and package interface (such as that found in video game devices), a removable memory chip (such as an EPROM or PROM) and associated socket, and other removable storage units 420 and interfaces 422 which allow software and data to be transferred from the removable storage unit 420 to computer system 400.

Computer system 400 may also include a communications interface 424. Communications interface 424 allows software and data to be transferred between the computer system and external devices. Examples of communications interface 424 may include a modem, a network interface (such as an Ethernet card), a communications port, a PCM-CIA slot and card, etcetera. Software and data transferred via communications interface 424 are in the form of signals which may be, for example, electronic, electromagnetic, optical, or other signals capable of being received by communications interface 424. These signals are provided to communications interface 424 via communication path (i.e., channel) 426. Communication path 426 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 410 and secondary memory 412, removable storage drive 416, and a hard disk installed in hard disk drive 414. Computer programs (also called computer control logic) are stored in main memory 410, and/or secondary memory 412. Computer programs may also be received via communications interface 424. Such computer programs, when run, enable the computer system to perform the features of the present disclosure as discussed herein. In particular, the computer programs, when run, enable processor 402 to perform the features of the computer system. Accordingly, such computer programs represent controllers of the computer system.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, a process, a method, an article, or an apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    testing a condition code anticipator (CCA) circuit, the testing comprising:
    generating, by an execution unit executing on a system comprising one or more processors, a data result and a special case indicator, the generating comprising performing an arithmetic computation based at least in part on an instruction and at least one input data operand, wherein the system comprises the execution unit, the condition code anticipator (CCA) circuit, and CCA circuit verification logic;
    outputting, by the execution unit, the data result to a processor core;
    generating, by the CCA circuit, a first condition code based on the instruction and the at least one input data operand;
    outputting, by the CCA circuit, the first condition code to the processor core;
    generating, by the execution unit, a second condition code based on the data result and the special case indicator; and
    performing, by the CCA circuit verification logic, a check by comparing the first condition code and the second condition code and flagging an error in the CCA circuit to the processor core upon the first condition code being different from the second condition code.

2. The computer-implemented method of claim 1, wherein the first condition code is outputted to the processor core prior to outputting the data result to the processor core, wherein the comparing of the first condition code and the second condition code comprises:
    determining whether the special case indicator indicates an exception; and
    determining whether the first condition code indicates the exception;
    wherein the flagging of the error to the processor core is based on one or both of:
        the first condition code indicating the exception and the special case indicator not indicating the exception; and
        the special case indicator indicating the exception and the first condition code not indicating the exception.

3. The computer-implemented method of claim 1, wherein the comparing of the first condition code and the second condition code comprises:
    determining whether the data result is equal to zero; and
    determining whether the first condition code indicates zero;
    wherein the flagging of the error to the processor core is based on one or both of:
        the first condition code indicating zero and the data result not being equal zero; or
        the data result being equal to zero and the first condition code not indicating zero.

4. The computer-implemented method of claim 1, wherein the comparing of the first condition code and the second condition code comprises:
    determining whether the data result is less than zero; and
    determining whether the first condition code indicates negative;
    wherein the flagging of the error to the processor core is based on one or both of:
        the first condition code indicating negative and the data result not being less than zero; or
        the data result being less than zero and the first condition code not indicating negative.

5. The computer-implemented method of claim 1, wherein the comparing of the first condition code and the second condition code comprises:
    determining whether the data result is greater than zero; and
    determining whether the first condition code indicates positive;
    wherein the flagging of the error to the processor core is based on one or both of:
        the first condition code indicating positive and the data result not being greater than zero; or
        the data result being greater than zero and the first condition code not indicating positive.

6. The computer-implemented method of claim 1, wherein the check is a reliability, availability, and serviceability (RAS) check.

7. The computer-implemented method of claim 1, wherein:
    the second condition code is equal to zero based on the data result being zero and the special case indicator not indicating an exception;
    the second condition code is equal to one based on a sign of the data result being negative and the special case indicator not indicating the exception;
    the second condition code is equal to two based on the sign of the data result being positive and the special case indicator not indicating the exception; and
    the second condition code is equal to three based on the special case indicator indicating the exception.

8. A computer program product comprising a computer readable storage medium having program instructions embodied therewith, wherein the computer readable storage medium is not a transitory signal per se, the program instructions executable by a system comprising one or more processors to cause the system to perform a method comprising:
    testing a condition code anticipator (CCA) circuit, the testing comprising:
    generating, by an execution unit executing on the system, a data result and a special case indicator, the generating comprising performing an arithmetic computation based at least in part on an instruction and at least one input data operand, wherein the system comprises the execution unit, the condition code anticipator (CCA) circuit, and CCA circuit verification logic;

outputting, by the execution unit, the data result to a processor core;

generating, by the CCA circuit, a first condition code based on the instruction and the at least one input data operand;

outputting, by the CCA circuit, the first condition code to the processor core;

generating, by the execution unit, a second condition code based on the data result and the special case indicator; and performing, by the CCA circuit verification logic, a check by comparing the first condition code and the second condition code and flagging an error to the processor core upon the first condition code being different from the second condition code.

9. The computer program product of claim 8, wherein the first condition code is outputted to the processor core prior to outputting the data result to the processor core, wherein the comparing of the first condition code and the second condition code comprises:

determining whether the special case indicator indicates an exception; and determining whether the first condition code indicates the exception;

wherein the flagging of the error to the processor core is based on one or both of:

the first condition code indicating the exception and the special case indicator not indicating the exception; or the special case indicator indicating the exception and the first condition code not indicating the exception.

10. The computer program product of claim 8, wherein the comparing of the first condition code and the second condition code comprises:

determining whether the data result is equal to zero; and determining whether the first condition code indicates zero;

wherein the flagging of the error to the processor core is based on one or both of:

the first condition code indicating zero and the data result not being equal zero; or the data result being equal to zero and the first condition code not indicating zero.

11. The computer program product of claim 8, wherein the comparing of the first condition code and the second condition code comprises:

determining whether the data result is less than zero; and determining whether the first condition code indicates negative;

wherein the flagging of the error to the processor core is based on one or both of:

the first condition code indicating negative and the data result not being less than zero; or the data result being less than zero and the first condition code not indicating negative.

12. The computer program product of claim 8, wherein the comparing of the first condition code and the second condition code comprises:

determining whether the data result is greater than zero; and determining whether the first condition code indicates positive;

wherein the flagging of the error to the processor core is based on one or both of:

the first condition code indicating positive and the data result not being greater than zero; or the data result being greater than zero and the first condition code not indicating positive.

13. The computer program product of claim 8, wherein the check is a reliability, availability, and serviceability (RAS) check.

14. The computer program product of claim 8, wherein:

the second condition code is equal to zero based on the data result being zero and the special case indicator not indicating an exception;

the second condition code is equal to one based on a sign of the data result being negative and the special case indicator not indicating the exception;

the second condition code is equal to two based on the sign of the data result being positive and the special case indicator not indicating the exception; and the second condition code is equal to three based on the special case indicator indicating the exception.

15. A system comprising one or more processors configured to perform a method comprising:

testing a condition code anticipator (CCA) circuit, the testing comprising:

generating by an execution unit executing on the system, a data result and a special case indicator, the generating comprising performing an arithmetic computation based at least in part on an instruction and at least one input data operand, wherein the system comprises the execution unit, the condition code anticipator (CCA) circuit, and CCA circuit verification logic;

outputting, by the execution unit, the data result to a processor core;

generating, by the CCA circuit, a first condition code based on the instruction and the at least one input data operand;

outputting, by the CCA circuit, the first condition code to the processor core to the processor core;

generating, by the execution unit, a second condition code based on the data result and the special case indicator; and performing, by the CCA circuit verification logic, a check by comparing the first condition code and the second condition code and flagging an error to the processor core upon the first condition code being different from the second condition code.

16. The system of claim 15, wherein the first condition code is outputted to the processor core prior to outputting the data result to the processor core, wherein the comparing of the first condition code and the second condition code comprises:

determining whether the special case indicator indicates an exception; and determining whether the first condition code indicates the exception;

wherein the flagging of the error to the processor core is based on one or both of:

the first condition code indicating the exception and the special case indicator not indicating the exception; or the special case indicator indicating the exception and the first condition code not indicating the exception.

17. The system of claim 15, wherein the comparing of the first condition code and the second condition code further comprises:

determining whether the data result is equal to zero; and determining whether the first condition code indicates zero;

wherein the flagging of the error to the processor core is based on one or both of:
the first condition code indicating zero and the data result not being equal zero; or
the data result being equal to zero and the first condition code not indicating zero.

18. The system of claim 15, wherein the comparing of the first condition code and the second condition code comprises:
determining whether the data result is less than zero; and
determining whether the first condition code indicates negative;
wherein the flagging of the error to the processor core is based on one or both of:
the first condition code indicating negative and the data result not being less than zero; or
the data result being less than zero and the first condition code not indicating negative.

19. The system of claim 15, wherein the comparing of the first condition code and the second condition code comprises:
determining whether the data result is greater than zero; and
determining whether the first condition code indicates positive;
wherein the flagging of the error to the processor core is based on one or both of:
the first condition code indicating positive and the data result not being greater than zero; or
the data result being greater than zero and the first condition code not indicating positive.

20. The system of claim 15, the wherein the check is a reliability, availability, and serviceability (RAS) check.

* * * * *